United States Patent
Kuntagod et al.

(10) Patent No.: US 11,863,626 B2
(45) Date of Patent: Jan. 2, 2024

(54) COMPLEX SYSTEM FOR MESSAGE DOWNLINK CHANNEL CONTROL

(71) Applicant: Accenture Global Solutions Limited, Dublin (IE)

(72) Inventors: Nataraj Kuntagod, Bangalore (IN); Venkatesh Subramanian, Bangalore (IN); Satyasai Srinivas Abbabathula, Bangalore (IN); Rambhau Eknath Rote, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 235 days.

(21) Appl. No.: 17/463,121

(22) Filed: Aug. 31, 2021

(65) Prior Publication Data

US 2023/0065139 A1    Mar. 2, 2023

(51) Int. Cl.
| | | |
|---|---|---|
| *H04L 67/12* | (2022.01) | |
| *H04W 4/50* | (2018.01) | |
| *G06F 18/23* | (2023.01) | |
| *H04W 72/23* | (2023.01) | |

(52) U.S. Cl.
CPC .............. *H04L 67/12* (2013.01); *G06F 18/23* (2023.01); *H04W 4/50* (2018.02); *H04W 72/23* (2023.01)

(58) Field of Classification Search
CPC ..... H04L 67/12; H04L 5/0037; H04L 5/0044; H04L 5/0094; G06F 18/23; H04W 4/50; H04W 72/23
See application file for complete search history.

(56) References Cited

U.S. PATENT DOCUMENTS

| | | | |
|---|---|---|---|
| 10,140,191 B2 | 11/2018 | Kaulgud et al. | |
| 10,437,654 B2 | 10/2019 | Kumaresan et al. | |
| 10,623,932 B2 | 4/2020 | Maitra et al. | |
| 2006/0047666 A1* | 3/2006 | Bedi | G06F 16/958 |
| 2010/0223335 A1* | 9/2010 | Fu | H04L 12/1818 709/205 |
| 2011/0307603 A1 | 12/2011 | Ishikawa | |
| 2018/0167785 A1* | 6/2018 | Wang | H04L 67/566 |
| 2018/0189303 A1 | 7/2018 | Mankovskii | |
| 2018/0262450 A1* | 9/2018 | Reyes | H04L 51/214 |
| 2019/0361412 A1 | 11/2019 | Park et al. | |
| 2019/0392457 A1 | 12/2019 | Kuntagod et al. | |

FOREIGN PATENT DOCUMENTS

WO    WO 2020/112793 A2    6/2020

OTHER PUBLICATIONS

Extended European Search Report in Europe Application No. 22187302.9, dated Jan. 16, 2023, 9 pages.

* cited by examiner

*Primary Examiner* — Ayaz R Sheikh
*Assistant Examiner* — Tarell A Hampton
(74) *Attorney, Agent, or Firm* — Crowell & Moring LLP

(57) ABSTRACT

A system may receive published messages over an uplink channel. The system may, via channel control logic (CCL), delegate the messages to one or more subject-domain downlink channels (SDDCHs). The CCL may determine to create new SDDCHs to facilitate accurate placement of messages within defined subject-domains corresponding to the various SDDCHs.

19 Claims, 6 Drawing Sheets

COMPLEX SYSTEM FOR MESSAGE DOWNLINK CHANNEL CONTROL

TECHNICAL FIELD

This disclosure relates to a complex system for message downlink channel control.

BACKGROUND

The advent of Internet of Things (IoT) technology has exponentially increased the functionality of devices. Appliances in the home can now be made smart and react to a multitude of different inputs to adjust parameters such as daily power consumption patterns or other performance and/or efficiency aspects. Sensors may communicate across massive arrays. Further, companies have access to increasingly granular data regarding consumer habits. Increases in the performance, functionality, and/or efficiency of IoT devices will continue to drive demand in the market.

DETAILED DESCRIPTION

In various scenarios, edge devices such as Internet of Things (IoT) devices, sensor arrays, smart appliances, or other devices create an increasing number of published messages. The published messages may be used to control (or otherwise affect) operations at a subscriber edge device. In some cases, a subscriber edge device may listen to published messages from multiple other edge devices to perform the prescribed functions of the subscriber edge device. In some cases, the subscriber edge device may also ignore messages from various other edge devices. In some cases, the number of devices that may be publishing messages may be large and produce a large volume of messages.

In some implementations, a single uplink channel (or a static number of uplink channels) may be used to receive messages from publishers and a single downlink channel (or a static number of downlink channels) may be used to deliver published messages to the subscriber edge devices. For the downlink channels, the subscriber edge devices may execute listener routines that capture the messages on the downlink channel. In some cases, the computing resources expended in distinguishing messages of interest from messages that should be ignored may be a non-negligible amount of computing resources. In other words, the computing resources used in distinguishing messages may affect computation performance for other functions of the subscriber edge device.

In some implementations, dynamic assignment of defined subject-domain downlink channels (SDDCHs) may allow for direction of messages based on the content/characteristics of the message. A subscriber may select SDDCHs containing the particular information used by the subscriber to reduce the expected number of messages that may be ignored by the subscriber (because various ones those messages may be sent to SDDCHs that the subscriber does not listen to). Accordingly, the SDDCH architectures and techniques described may improve the operation of the underlying hardware of the subscriber edge-devices by reducing the overall computing load applied to message reception and analysis.

Figure 1:
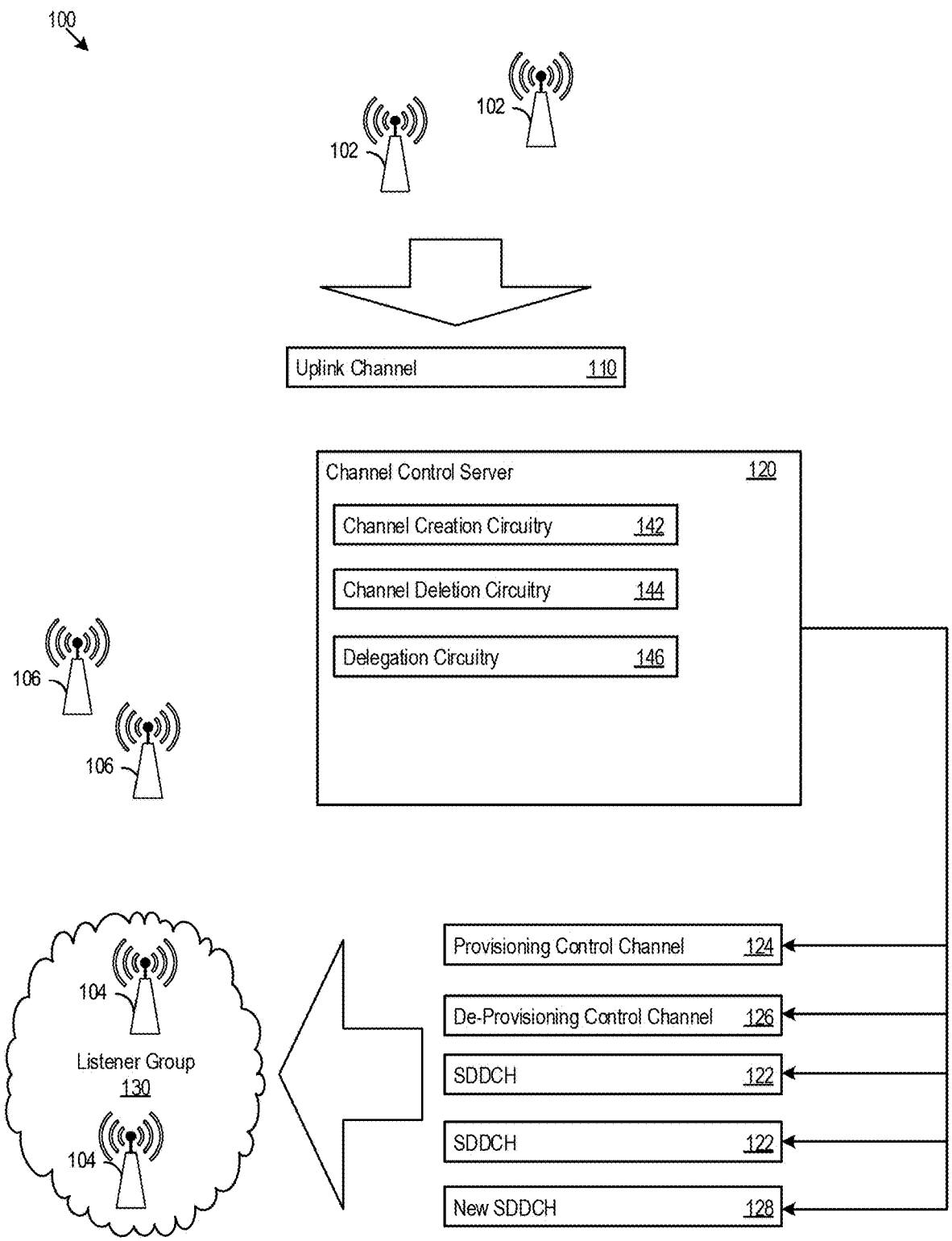
FIG. 1 shows an example edge device messaging environment.

FIG. 1 shows an example edge device messaging environment (EDME) 100. The EDME 100 may include sources 102 (e.g., publisher devices that may be edge-positioned) and subscriber edge devices 104, 106. A channel control server (CCS) 120 may receive messages from the publisher devices 102 via an uplink channel 110. The CCS 120 may place the messages into one or more subject-domain channels 122 based on the characteristics of the messages. The CCS 120 may indicate the presence of existing SDDCHs 122 or new SDDCHs 128 via a provisioning control channel 124. The CCS 120 may indicate deletion of SDDCHs on a de-provisioning control channel 126. In some cases, channel creation circuitry 142 within the CCS 120 may determine to create a new SDDCH 128. In some cases, channel deletion circuitry 144 within the CCS 120 may determine to de-provisional a previous SDDCH. Delegation circuitry 146 may determine when particular messages fall within a subject-domain. A listener group 130 of subscriber edge-positioned devices may listen to one or more of the control channels and/or SDDCHs 122, 128 (e.g., by executing listener routines for the channels).

Figure 2:
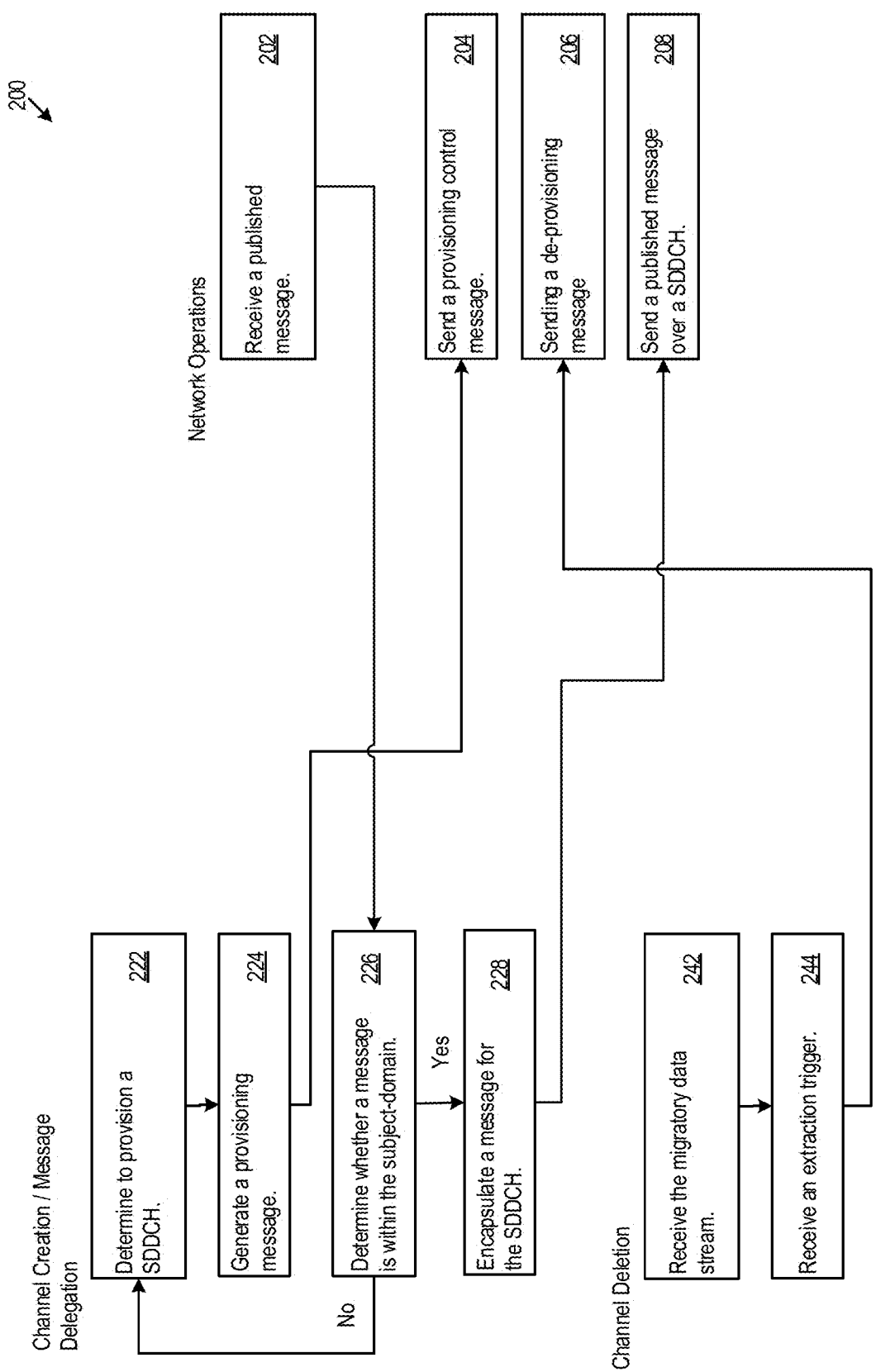
FIG. 2 shows example channel control logic.

Referring now to FIG. 2 while still continuing to refer to FIG. 1, example channel control logic CCL 200 is shown. The CCL 200 may be executed on channel creation circuitry 142, channel deletion circuitry 144, delegation circuitry 146, or a grouping thereof (e.g., as general channel control circuitry). The channel control logic CCL 200 may further govern the operation of network interface circuitry (e.g., such as transmission interfaces 312 discussed below) to effect send/receive operations for uplink/downlink channels and/or control channels.

The CCL 200 may govern incoming and outgoing communications at network circuitry, e.g., to effect channel management and transmission. For example, via network interface circuitry, the CCL 200 may receive, over an uplink channel, a published message from an edge-positioned source (202). The CCL 200 may, at the network circuitry, send, to an edge-positioned listener group and over a provisioning control channel, a provisioning message associated with provisioning of a SDDCH (204). In some cases, the CCL 200 may send deprovisioning messages, e.g., to delete one or more SDDCHs (206). Further, the CCL 200 may, via the network circuitry, send a published message received via the uplink channels to edge-positioned subscribers over the new SDDCH (or another existing SDDCH) (208).

To manage SDDCH creation operations, the CCL 200 may determine to provision a SDDCH (222). The SDDCH may be configured to transmit messages within a defined subject-domain. As discussed above, the subject-domain may be defined based on the characteristics of the messages and/or their content. Further, the defined subject-domain may be selected to avoid redundancy with the subject-domains of other existing SDDCHs.

The determination to provision a SDDCH may include a determination spurred receiving a published message that is outside the existing subject-domains for existing SDDCHs. In some cases, such a determination may be performed by the CCL 200 at delegation circuitry, which may be configured to delegate messages to specific SDDCHs in according their corresponding subject-domains.

In some cases, the determination of whether to create new SDDCH may be based on certain conditions being met. For example, a sensor or group of sensors, may detect a number of threshold-exceeding data values. For example, a group of sensors may detect temperatures over/under a given threshold-value. The presence of these threshold breaches may provide cause for a dedicated SDDCH. In some cases, the determination may be based on clustering in data as identified by a machine learning algorithm. For example, an unstructured machine learning algorithm may identify distinct data nodes within data and suggest the creation of one or more SDDCHs to individually serve data within the identified clusters. In some cases, the determination may be in response to a terminal command from an operator. In some cases, a knowledge graph may include metadata and relationships for the sources. Along with the data for the sources, the knowledge graph may include defined conditions for the creation/deletion of SDDCHs. In some cases, subscribers may provide wish list votes for new SDDCHs. A determination to create a SDDCH may include receiving more than a threshold number of votes for a particular SDDCH. Greater details are provided below in connection with the description of Example Implementations for Channel Creations.

After determining to provision a new SDDCH, the CCL 200 may generate a provisioning message for the SDDCH (224). The provisioning message may include an indication of the defined subject-domain. For example, the SDDCH may have a channel name. In some cases, the channel name may indicate the subject-domain for the SDDCH. For example, a SDDCH with channel name Pune.Temperature may include messages with temperature data for the city of Pune. Sources that provide data relevant to the subject-domain may be identified through metadata (such as source sensor-type data, source identifier data, or other metadata) knowledge graph data, or other source relevant data. In various cases, subject-domains may be defined in accord with geographic region, a data type, a sensor type, an IoT device type, other message or source characteristic, or a combination of characteristics.

The provisioning message may also include a channel-definition for transmission of the SDDCH. For example, the channel-definition may include an encapsulation instruction. The encapsulation instruction may indicate how a message should be altered and/or encoded to be transmitted as part of the relevant SCCDH. In some cases, encapsulation may include adding a header, such as the channel name, to messages on the channel. However, various other encapsulation techniques may be used. The encapsulation instruction may include information on how a subscriber may identify the messages that are included in the channel, e.g., listening instructions. For example, the listening instructions may include an indication of the content and location of a header added to messages transmitted in the channel.

After creation of an SDDCH, the CCL 200 may determine that one or more published messages fall within the defined subject-domain of the SDDCH based on the content of the messages and/or characteristics of the source of the messages (226). After identifying a message within the subject-domain of an SDDCH, the CCL 200 may assign the message to that SDDCH by encapsulating the message in accord with the encapsulation instructions in the provisioning message for that SDDCH (228).

To manage SDDCH deletion operations, the CCL 200 may determine to eliminate the SDDCH when a deletion criterion is met (242). A deletion criterion may include a timeout period. If a published message is not received within the timeout period that would be posted to the channel being evaluated for deletion, the CCL 200 may determine to delete the SDDCH. In some cases, even with an expired timeout window, the CCL 200 may not necessarily delete a SDDCH. In some cases, SSDCHs of some subject-domains may generate messages after long periods with no messages. For example, seasonal temperature variations may preclude (e.g., for entire seasons) messages from appearing on an SDDCH for messages indicating temperatures exceeding certain thresholds. For example, during winter months in some regions temperatures might not go above a temperature regularly exceeded in the summer, or vice versa. After determining to delete a SDDCH, the CCL 200 may generate a de-provisioning message for the SDDCH (244). The CCL 200 may then send the de-provisioning message over a de-provisioning control channel monitored by a listening group of edge-devices.

Figure 3:
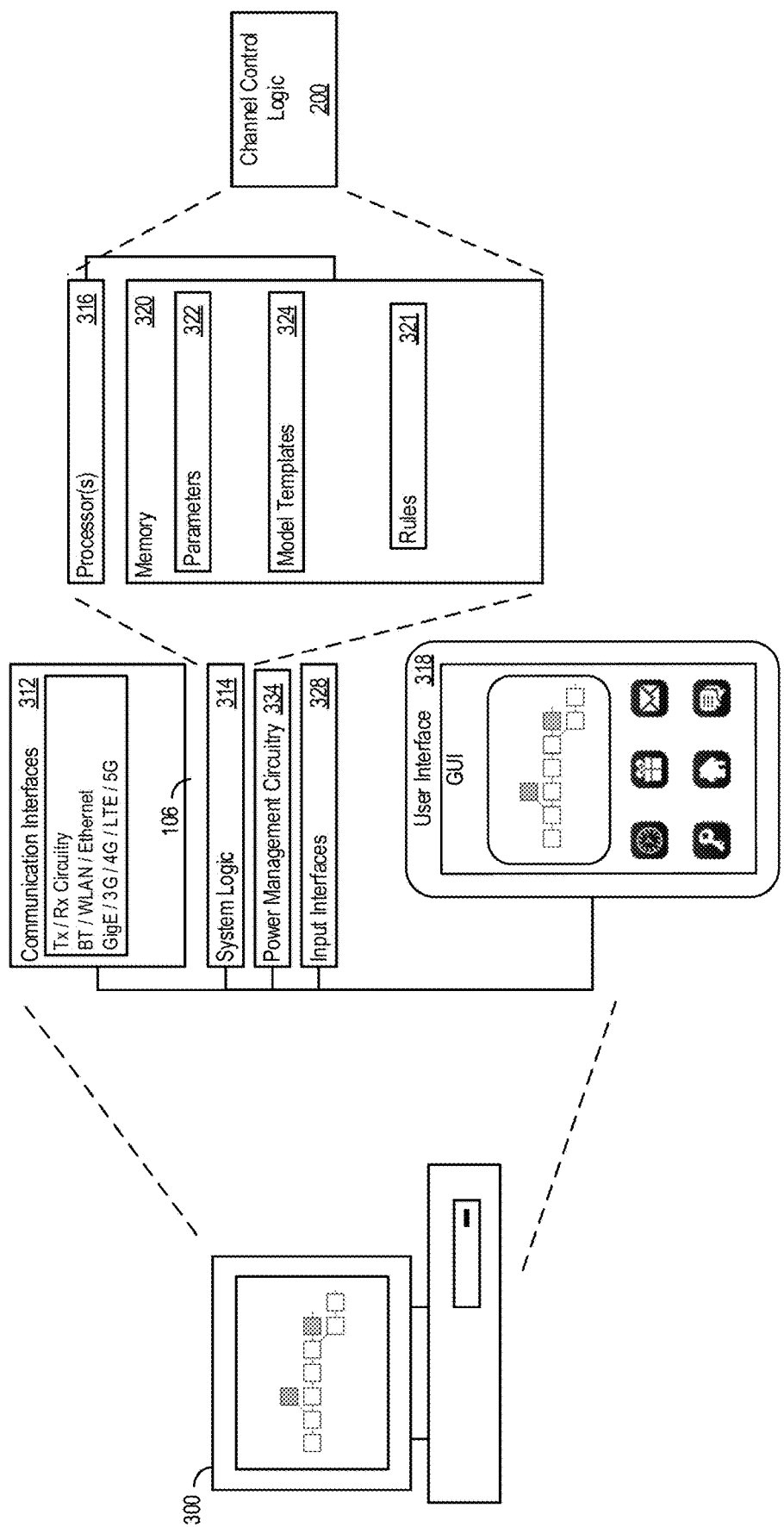
FIG. 3 shows an example channel control server.

FIG. 3 shows an example CCS 300. The CCS 300 may include system logic 314 to support channel control operations such as message delegation. channel creation, and channel deletion. The system logic 314 may include processors 316, memory 320, and/or other circuitry (e.g., such as channel creation circuitry, channel deletion circuitry, and/or delegation circuitry), which may be used to implement the example CCL 200. Thus, in some cases, the system logic 314 may act as the channel creation circuitry, channel deletion circuitry, and/or delegation circuitry.

The memory 320 may be used to store parameters 322 and/or model templates 324 used in channel control and/or message delegation. The memory 320 may further store rules 321 that may facilitate channel control, message delegation and/or the execution of other tasks.

The memory 320 may further include applications and structures, for example, coded objects, templates, or one or more other data structures to facilitate channel control, message delegation and/or the execution of other tasks. The CCS 300 may also include one or more communication interfaces 312, which may support wireless, e.g. Bluetooth, Wi-Fi, WLAN, cellular (3G, 4G, LTE/A, 5G), and/or wired, ethernet, Gigabit ethernet, and/or optical networking protocols. The communication interface 312 may support communication, e.g., as network interface circuitry, with sources and/or subscribers used to facilitate channel control, message delegation and/or the execution of other tasks. Additionally or alternatively, the communication interface 312 may support secure information exchanges, such as secure socket layer (SSL) or public-key encryption-based protocols for sending and receiving private data. The CCS 300 may include power management circuitry 334 and one or more input interfaces 328.

The CCS 300 may also include a user interface 318 that may include man-machine interfaces and/or graphical user interfaces (GUI). The GUI may be used to present interfaces, such as those used to facilitate channel creation/deletion determinations, and/or options to facilitate channel control, message delegation and/or the execution of other tasks.

Example Implementations for Channel Creation

Various implementations have been specifically described. However, many other implementations are also possible. For example, the example implementations included below are described to be illustrative of various ones of the principles discussed above. However, the examples included below are not intended to be limiting, but rather, in some cases, specific examples to aid in the illustration of the above described techniques and architectures. The features of the following example implementations may be combined in various groupings in accord with the techniques and architectures describe above.

Figure 4:
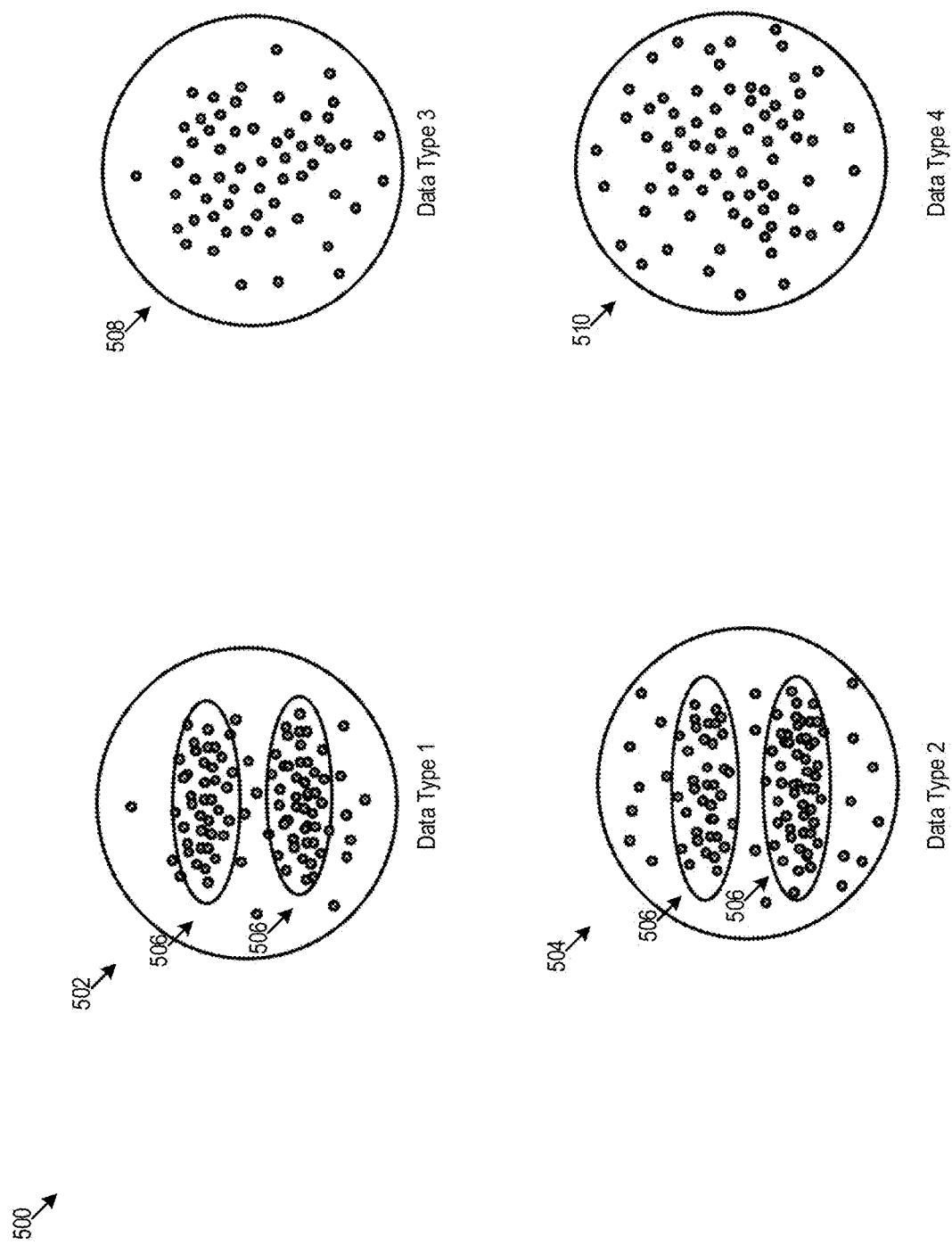
FIG. 4 shows example clustering logic.

FIG. 4 shows example clustering logic 500 for channel creation. The clustering logic 500 may monitor data within message contents. Over multiple data values, the clustering logic, e.g., through machine learning analysis (as discussed above) may identify data clusters. The clustering logic 500 may generate indications of data clustering for the CCL 200, which the CCL 200 may use for channel creation determinations. In the example scenario shown in FIG. 5, the clustering logic 500 evaluates four data types. For two of the data types 502, 504, data clusters 506 are identified by the clustering logic 500. For the remaining two data types 508, 510, no clusters are identified by the clustering logic.

Figure 5:
FIG. 5 shows example wish list logic.

FIG. 5 shows example wish list logic 400 for channel creation. The example wish list logic 400 may maintain a wish list 402 of requested subject-domains from among a subscriber group. New SDDCHs may be created for wish list items 404 with request numbers meeting creation criteria. For example, the most requested items may have corresponding SDDCHs created. In some cases, items with requests above pre-defined threshold may be created. In some cases, item-specific criteria may be used. For example, certain subject domains may be created in response to fewer requests that may required for other subject domains. In some cases, the criteria for wish list item creation may be stored within a knowledge graph.

Figure 6:
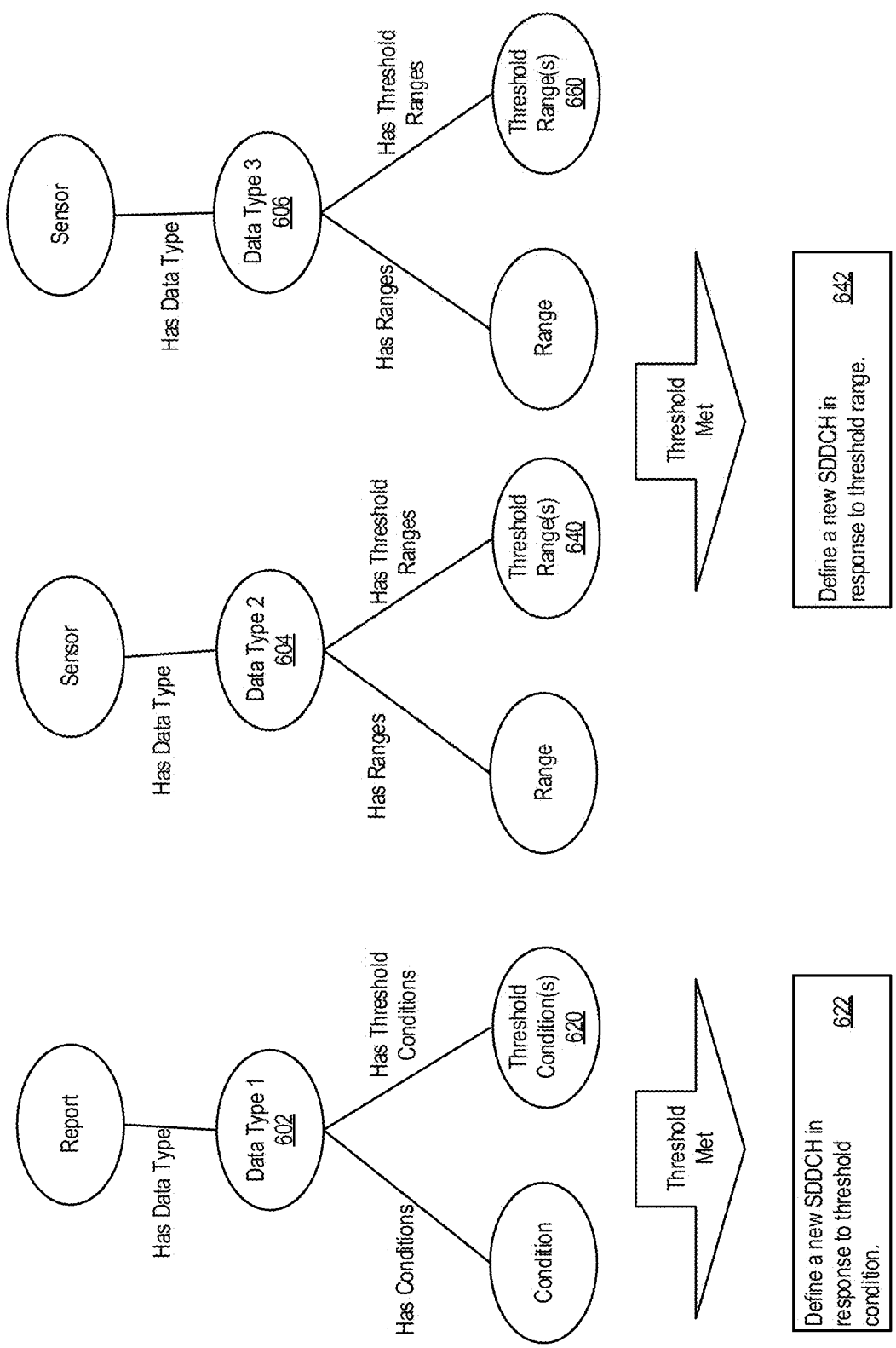
FIG. 6 shows example knowledge graph logic.

FIG. 6 shows example knowledge graph logic 600 for channel creation. The example knowledge graph logic 600 may include characteristic data for multiple data types 602, 604, 606. The knowledge graph logic 600 may further define conditions 620 and/or data ranges 640, 660 that meet threshold criteria. Accordingly, messages reporting such conditions 620 or data ranges 640, 660 may cause the threshold criteria to be met. The knowledge graph logic may further define responses for meeting the different threshold criteria. For example, a new SDDCH may be made in response to the threshold condition being met (622). In another example, a SDDCH may be created when a data point (or multiple data points) within the threshold range received (642). Additionally or alternatively, the threshold criteria may include wish list request consistent with the threshold ranges (e.g., SDDCHs are created when wish lists requests for data within the range are made).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. Table 1 includes examples.

TABLE 1

Examples

E1. A system including:
network interface circuitry configured to:
    receive, via an uplink channel, a published
      message from an edge-positioned source;
    send, to an edge-positioned subscriber
      group and over a provisioning control
      channel, a provisioning message
      associated with provisioning of a subject-
      defined downlink channel (SDDCH); and
    send the published message over the SDDCH; and
channel creation circuitry configured to:
    determine to provision the SDDCH,
      the SDDCH configured to transmit
      messages within a defined subject-domain,
      the defined subject-domain
      different from an existing subject-domain for
      an existing downlink channel;
    generate the provisioning message, the
      provisioning message including:
        an indication of the defined subject-domain; and
        a channel-definition for transmission
          of the SDDCH, the channel-
          definition including an encapsulation instruction
          for assigning messages to the SDDCH;
    based on metadata associated with the
      edge-positioned source, determine that
      the published message falls within the defined
      subject-domain; and
    encapsulate the published message in accord with the
      encapsulation instruction to cause the network interface
      circuitry to send the published message over the SDDCH.
E2. The system of example E1 or any other example
in this table, where the encapsulation instruction is further
configured to provide a listening instruction to
allow one or more edge-positioned subscribers to monitor the SDDCH.

TABLE 1-continued

Examples

E3. The system of example E1 or any other example in this
table, where the subject-domain includes:
    an indication of a geographic region;
    an indication of a data type;
    an indication of a sensor type;
    an indication of an internet of things (loT) device type; or
    any grouping of the foregoing.
E4. The system of example E1 or any other example in this table,
where the channel creation circuitry is configured to determine
to provision the SDDCH by determining that the published
message has a new message type that is outside of
the existing subject-domain.
E5. The system of example E1 or any other example in
this table, further including channel deletion circuitry configured
to determine to eliminate the SDDCH when a
deletion criterion is met.
E6. The system of example E5 or any other example in this
table, where the deletion criterion includes a timeout
period for receiving a message within the
defined subject-domain over the uplink channel.
E7. The system of example E1 or any other example in this
table, further including channel deletion circuitry configured
to delete the SDDCH and cause the network
interface circuitry to send a de-provisioning message for
the SDDCH over a de-provisioning control channel.
E8. The system of example E1 or any other example in
this table, where the channel creation circuitry is
configured to determine to provision the SDDCH by
determining that a request threshold from the
edge-positioned subscriber group for
the defined subject-domain has been met.
E9. The system of example E1 or any other example in
this table, where the channel creation circuitry is configured
to determine to provision the SDDCH by
determining that a critical data condition has been
met for the defined subject-domain.
E10. The system of example E9 or any other
example in this table, where the critical
data condition is defined on a knowledge graph.
E11. The system of example E1 or any other example
in this table, where the channel creation circuitry is
configured to determine to provision the SDDCH by
executing an unsupervised clustering
algorithm over a data set including a
published data value within the published message.
E12. The system of example E1 or any other example
in this table, further including delegation circuitry
configured to determine whether the published message falls
within the existing subject-domain.
E13. A method including:
at network interface circuitry:
    receiving, via an uplink channel, a published
    message from an edge-positioned source;
    sending, to an edge-positioned subscriber
    group and over a provisioning
    control channel, a provisioning message
    associated with provisioning of a
    subject-defined downlink channel (SDDCH); and
    sending the published message over the SDDCH; and
at channel creation circuitry:
    determining to provision the SDDCH,
    the SDDCH configured to transmit
    messages within a defined subject-domain,
    the defined subject-domain different from an
    existing subject-domain for an existing downlink channel;
    generating the provisioning message, the
    provisioning message including:
        an indication of the defined subject-domain; and
        a channel-definition for transmission of the SDDCH, the
        channel-definition including an encapsulation instruction
        for assigning messages to the SDDCH;
    based on metadata associated with the
    edge-positioned source, determining
    that the published message falls within
    the defined subject-domain; and
    encapsulating the published message in accord with the
    encapsulation instruction to cause the network interface circuitry
    to send the published message over the SDDCH.
E14. The method of example E13, where the encapsulation
instruction includes a listening instruction to allow one
or more edge-positioned subscribers to monitor the
SDDCH.
E15. The method of example E13 or any other example
in this table, where the subject-domain includes:
    an indication of a geographic region;
    an indication of a data type;
    an indication of a sensor type;
    an indication of an internet of things (loT) device type; or
    any grouping of the foregoing.
E16. The method of example E13 or any other example
in this table, where the determining to provision the
SDDCH includes determining that the published
message has a new message type that is outside
of the existing subject-domain.
E17. The method of example E13 or any other example
in this table, further including determining to eliminate
the SDDCH when a deletion criterion is met.
E18. The method of example E17 or any other example
in this table, where the deletion criterion includes a
timeout period for receiving a message within the
defined subject-domain over the uplink channel.
E19. A product including:
machine-readable media other than a transitory signal; and
instructions stored on the machine-readable media,
the instructions configured to,
    when executed, cause a machine to:
        at network interface circuitry:
            receive, via an uplink channel, a published
            message from an edge-positioned source;
            send, to an edge-positioned subscriber
            group and over a provisioning
            control channel, a provisioning message
            associated with provisioning
            of a subject-defined downlink channel (SDDCH); and
            send the published message over the SDDCH; and
        at channel creation circuitry:
            determine to provision the SDDCH,
            the SDDCH configured to transmit
            messages within a defined subject-domain,
            the defined subject-domain different from an
            existing subject-domain for an existing
            downlink channel;
            generate the provisioning message, the
            provisioning message including:
                an indication of the defined subject-domain; and
                a channel-definition for transmission of the SDDCH,
                the channel-definition including an encapsulation
                instruction for assigning
                messages to the SDDCH;
            based on metadata associated with
            the edge-positioned source,
                determine that the published message falls within
                the defined subject-domain; and
                encapsulate the published message in
                accord with the encapsulation
                instruction to cause the network interface circuitry to
                send the published message over the SDDCH.
E20. The product of example E19 or any other example in this
table, where the instructions are further configured to
cause the machine to, at delegation circuitry, determine whether the
published message falls within the existing subject-domain.

Headings and/or subheadings used herein are intended only to aid the reader with understanding described implementations.

What is claimed is:

1. A system including:
network interface circuitry configured to:
    receive, via an uplink channel, a published message from an edge-positioned source;
    send, to an edge-positioned subscriber group and over a provisioning control channel, a provisioning message associated with provisioning of a subject-defined downlink channel (SDDCH); and send the published message over the SDDCH; and channel creation circuitry configured to:

determine to provision the SDDCH by executing an unsupervised clustering algorithm over a data set including a published data value within the published message, the SDDCH configured to transmit messages within a defined subject-domain, the defined subject-domain different from an existing subject-domain for an existing downlink channel;

generate the provisioning message, the provisioning message including:

an indication of the defined subject-domain; and a channel-definition for transmission of the SDDCH, the channel-definition including an encapsulation instruction for assigning messages to the SDDCH;

based on metadata associated with the edge-positioned source, determine that the published message falls within the defined subject-domain; and encapsulate the published message in accord with the encapsulation instruction to cause the network interface circuitry to send the published message over the SDDCH.

2. The system of claim 1, where the encapsulation instruction is further configured to provide a listening instruction to allow one or more edge-positioned subscribers to monitor the SDDCH.

3. The system of claim 1, where the subject-domain includes:

an indication of a geographic region;

an indication of a data type;

an indication of a sensor type;

an indication of an internet of things (IoT) device type; or any grouping of the foregoing.

4. The system of claim 1, where the channel creation circuitry is configured to determine to provision the SDDCH by determining that the published message has a new message type that is outside of the existing subject-domain.

5. The system of claim 1, further including channel deletion circuitry configured to determine to eliminate the SDDCH when a deletion criterion is met.

6. The system of claim 5, where the deletion criterion includes a timeout period for receiving a message within the defined subject-domain over the uplink channel.

7. The system of claim 1, further including channel deletion circuitry configured to delete the SDDCH and cause the network interface circuitry to send a de-provisioning message for the SDDCH over a de-provisioning control channel.

8. The system of claim 1, where the channel creation circuitry is configured to determine to provision the SDDCH by determining that a request threshold from the edge-positioned subscriber group for the defined subject-domain has been met.

9. The system of claim 1, where the channel creation circuitry is configured to determine to provision the SDDCH by determining that a critical data condition has been met for the defined subject-domain.

10. The system of claim 9, where the critical data condition is defined on a knowledge graph.

11. The system of claim 1, further including delegation circuitry configured to determine whether the published message falls within the existing subject-domain.

12. A method including:

at network interface circuitry:

receiving, via an uplink channel, a published message from an edge-positioned source;

sending, to an edge-positioned subscriber group and over a provisioning control channel, a provisioning message associated with provisioning of a subject-defined downlink channel (SDDCH); and sending the published message over the SDDCH; and at channel creation circuitry:

determining to provision the SDDCH by executing an unsupervised clustering algorithm over a data set including a published data value within the published message, the SDDCH configured to transmit messages within a defined subject-domain, the defined subject-domain different from an existing subject-domain for an existing downlink channel;

generating the provisioning message, the provisioning message including:

an indication of the defined subject-domain; and a channel-definition for transmission of the SDDCH, the channel-definition including an encapsulation instruction for assigning messages to the SDDCH;

based on metadata associated with the edge-positioned source, determining that the published message falls within the defined subject-domain; and encapsulating the published message in accord with the encapsulation instruction to cause the network interface circuitry to send the published message over the SDDCH.

13. The method of claim 12, where the encapsulation instruction includes a listening instruction to allow one or more edge-positioned subscribers to monitor the SDDCH.

14. The method of claim 12, where the subject-domain includes:

an indication of a geographic region;

an indication of a data type;

an indication of a sensor type;

an indication of an internet of things (IoT) device type; or any grouping of the foregoing.

15. The method of claim 12, where the determining to provision the SDDCH includes determining that the published message has a new message type that is outside of the existing subject-domain.

16. The method of claim 12, further including determining to eliminate the SDDCH when a deletion criterion is met.

17. The method of claim 16, where the deletion criterion includes a timeout period for receiving a message within the defined subject-domain over the uplink channel.

18. A product including:

machine-readable media other than a transitory signal; and instructions stored on the machine-readable media, the instructions configured to, when executed, cause a machine to:

at network interface circuitry:

receive, via an uplink channel, a published message from an edge-positioned source;

send, to an edge-positioned subscriber group and over a provisioning control channel, a provisioning message associated with provisioning of a subject-defined downlink channel (SDDCH); and send the published message over the SDDCH; and at channel creation circuitry:

determine to provision the SDDCH by executing an unsupervised clustering algorithm over a data set including a published data value within the published message, the SDDCH configured to transmit messages within a defined subject-domain, the defined subject-domain different from an existing subject-domain for an existing downlink channel;

generate the provisioning message, the provisioning message including:
an indication of the defined subject-domain; and
a channel-definition for transmission of the SDDCH, the channel-definition including an encapsulation instruction for assigning messages to the SDDCH;

based on metadata associated with the edge-positioned source, determine that the published message falls within the defined subject-domain; and encapsulate the published message in accord with the encapsulation instruction to cause the network interface circuitry to send the published message over the SDDCH.

19. The product of claim 18, where the instructions are further configured to cause the machine to, at delegation circuitry, determine whether the published message falls within the existing subject-domain.

\* \* \* \* \*